(12) United States Patent
Bhatia et al.

(10) Patent No.: US 12,333,175 B2
(45) Date of Patent: Jun. 17, 2025

(54) HYPERVISOR-ASSISTED MIGRATION OR CLONING OF EAGER-ZEROED VIRTUAL DISKS

(71) Applicant: VMWARE, INC., Palo Alto, CA (US)

(72) Inventors: Kashish Bhatia, Bangalore (IN); Zubraj Singha, Guwahati (IN); Goresh Vitthalrao Musalay, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/229,179

(22) Filed: Aug. 2, 2023

(65) Prior Publication Data

US 2024/0402933 A1 Dec. 5, 2024

(30) Foreign Application Priority Data

Jun. 2, 2023 (IN) .............................. 202341038072

(51) Int. Cl.
*G06F 3/06* (2006.01)
(52) U.S. Cl.
CPC ............ *G06F 3/065* (2013.01); *G06F 3/0604* (2013.01); *G06F 3/0632* (2013.01); *G06F 3/0647* (2013.01); *G06F 3/0664* (2013.01); *G06F 3/0665* (2013.01); *G06F 3/067* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 2004/0260919 | A1* | 12/2004 | Takahashi | H04L 69/329 713/2 |
| 2006/0224844 | A1* | 10/2006 | Kano | G06F 12/0223 711/165 |
| 2020/0097566 | A1* | 3/2020 | Diaconu | G06F 3/0647 |

* cited by examiner

*Primary Examiner* — Charles J Choi
(74) *Attorney, Agent, or Firm* — Kim & Stewart LLP

(57) ABSTRACT

A data structure tracks the usage of an eager-zeroed virtual disk on a per block basis and this data structure is referenced during migration or cloning of the eager-zeroed virtual disk so that copying of the zero blocks can be avoided. A method of migrating or cloning the eager-zeroed virtual disk stored in a first storage device comprises: determining for each of a plurality of unique sets of blocks using this data structure, whether or not any of the blocks in the unique set has been written to since the initialization of the virtual disk; and for each unique set determined to have at least one block that has been written to since the initialization of the virtual disk, issuing a copy command to make a copy of all blocks in the unique set in a second storage device.

20 Claims, 5 Drawing Sheets

HYPERVISOR-ASSISTED MIGRATION OR CLONING OF EAGER-ZEROED VIRTUAL DISKS

RELATED APPLICATIONS

Benefit is claimed under 35 U.S.C. 119 (a)-(d) to Foreign application No. 202341038072 filed in India entitled "HYPERVISOR-ASSISTED MIGRATION OR CLONING OF EAGER-ZEROED VIRTUAL DISKS", on Jun. 2, 2023, by VMware, Inc., which is herein incorporated in its entirety by reference for all purposes.

BACKGROUND

In virtualized computing systems, hypervisors support different techniques for initializing virtual disks. They include eager-zeroing and lazy-zeroing. For an eager-zeroed virtual disk, the space required is allocated at creation time by writing zeroes into all blocks of the virtual disk. For a lazy-zeroed virtual disk, the space required is not allocated at creation time, and zeroes are written to blocks of the virtual disk after creation time, for example, as they are accessed.

As such, lazy-zeroed virtual disks allocate space more efficiently. In addition, migrating and cloning lazy-zeroed virtual disks are more efficient as the actual size of the virtual disk in this format is smaller than that of the virtual disk that is eager-zeroed. Despite these disadvantages, eager-zeroed virtual disks are still in use and are requirements in many use cases. Therefore, techniques that provide for more efficient use of eager-zeroed virtual disks would be desirable.

SUMMARY

Embodiments provide a data structure that tracks the usage of an eager-zeroed virtual disk on a per block basis and this data structure is referenced during migration or cloning of the eager-zeroed virtual disk so that copying of the zero blocks can be avoided. A method of migrating or cloning an eager-zeroed virtual disk stored in a first storage device, according to one embodiment, comprises: determining for each of a plurality of unique sets of blocks (also referred to herein as "chunks") using the data structure, whether or not any of the blocks in the unique set has been written to since the initialization of the virtual disk; and for each unique set determined to have at least one block that has been written to since the initialization of the virtual disk, issuing a copy command to make a copy of all blocks in the unique set in a second storage device.

Further embodiments include a non-transitory computer-readable storage medium comprising instructions that cause a computer system to carry out the above methods, as well as a computer system configured to carry out the above methods.

DETAILED DESCRIPTION

Embodiments provide a more efficient method of migrating or cloning virtual disks that were initialized during creation as eager-zeroed virtual disks. This method employs a data structure that tracks the usage of an eager-zeroed virtual disk on a per block basis. Each time a write input/output (IO) command is issued to the virtual disk and the write IO completes successfully, the data structure is updated to indicate that the blocks which were written to are no longer zero blocks. During migration or cloning of the virtual disk, this data structure is referenced so that copying of zero blocks may be avoided.

Figure 1:
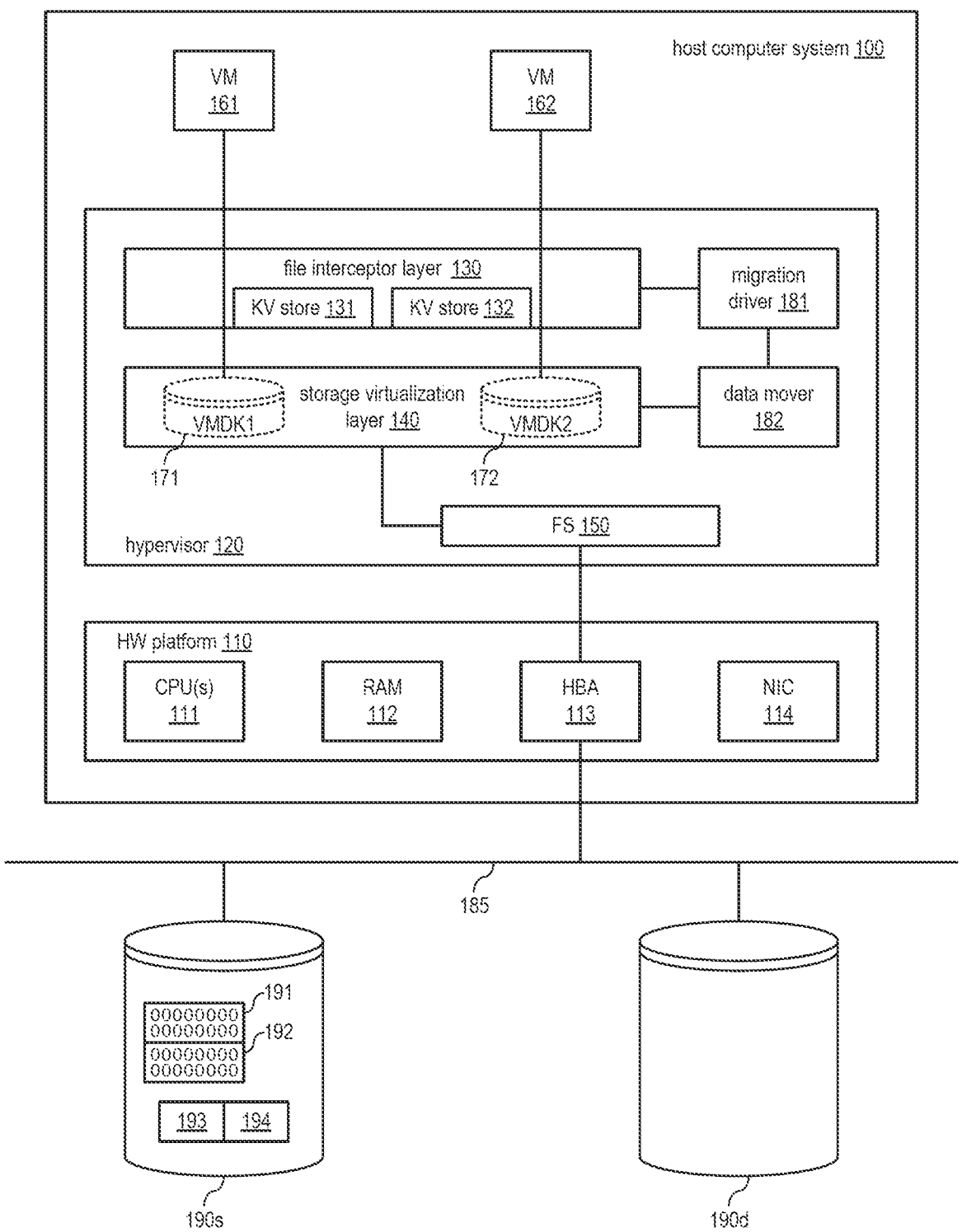
FIG. 1 is a block diagram of a host computer system in which a hypervisor is installed to support execution of virtual machines, as well as migration and cloning of virtual disks according to embodiments.

FIG. 1 is a block diagram of a host computer system 100 in which a hypervisor 120 is installed to support execution of virtual machines (VMs), e.g., VM 161 and VM 162, and migration of virtual disks, e.g., VMDK1 171 and VMDK2 172, from one storage device, e.g., source storage device 190$s$, to another storage device, e.g., destination storage device 190$d$, or cloning of virtual disks stored in one storage device in another storage device. In the embodiments described herein, for simplicity, only two VMs and only two virtual disks are depicted and only one of the virtual disks is migrated or cloned. However, it should be understood that the number of VMs and the number of virtual disks may be one or more, and the number of storage devices is two or more, one of which is the source storage device and another of which is the destination storage device. In addition, one virtual machine may employ more than one virtual disk as its persistent storage, and more than one virtual disk may be migrated or cloned in accordance with the techniques described herein.

As depicted in FIG. 1, hypervisor 120 is installed on top of hardware platform 110, which is, for example, a server grade hardware platform such as an x86 architecture platform. Hardware platform 110 includes one or more central processing units (CPUs) 111), system memory, e.g., random access memory (RAM) 112, a host bus adapter (HBA) 113, and a network interface controller (NIC) 114.

Host computer system 100 is connected to storage devices over a storage area network 185. Examples of storage devices are storage arrays including hard disk drives and/or solid state drives (e.g., flash memory). These storage devices include a storage controller for processing IOs issued thereto by host computer system 100, and a physical storage medium in which the storage controller stores data in response to a write IO and from which the storage controller retrieves data in response to a read IO.

Hypervisor 120 employs a file system (FS) 150 to organize the data stored in the storage devices as files and in units of blocks. In one embodiment, the block size is 4 megabytes (MB). When virtual disks (e.g., VMDK1 171 and VMDK2 172) are created, they are created as files of FS 150. FIG. 1 depicts VMDK1 171 stored as file 191 in storage device 190$s$ and VMDK2 172 stored as file 192 in storage device 190$s$. In addition to files that represent the virtual disks, hypervisor 120 creates metadata files associated with the virtual disk and a configuration file that stores the information of all the metadata files associated with the virtual disk. These other files associated with VMDK1 171 and VMDK2 172 are depicted in FIG. 1 as files 193 and files 194, respectively.

VMDK1 171 and VMDK2 172 are examples of eager-zeroed virtual disks and therefore they are initialized upon creation by writing zeroes into all of their blocks. FIG. 1 depicts the initialized state of the files of the virtual disks with each '0' representing a zero block. When IO commands are issued to the virtual disks from the VMs post-initialization, storage virtualization layer 140 translates these into file operations. Thereafter, FS 150 generates IO commands based on these file operations and issues the IO commands to the storage devices. To distinguish between the IO commands issued by the VMs and the IO commands issued by FS 150, the former is hereinafter referred to as "virtual" IO commands and the latter is hereinafter referred to as "physical" IO commands.

In the embodiments, a file interceptor layer 130 maintains a data structure, e.g., a key-value (KV) store, in RAM 112 that tracks the usage of each eager-zeroed virtual disk on a per block basis. Each time a write IO command is issued to the virtual disk and the write IO completes successfully, the data structure is updated to indicate that the blocks which were written to are no longer zero blocks. In the example illustrated in FIG. 1, KV store 131 is maintained to track the usage of VMDK1 171 and KV store 132 is maintained to track the usage of VMDK2 172. The key is the logical block address (specified in the write IO command) and the value is either '0' indicating a zero block and '1' indicating a non-zero block (i.e., a block that has been written to successfully). From time to time, file interceptor layer 130 saves the KV stores in persistent storage as one of the metadata files associated with the virtual disk, thereby syncing the copy of the KV store that is in persistent storage with the one that is in RAM 112. In the example illustrated herein, file interceptor layer 130 saves KV store 131 in storage device 190s as one of files 193 and KV store 132 in storage device 190s as one of files 194, when the number of updates to the respective KV store exceeds a threshold number. Alternatively, the syncing may be carried out on a periodic basis, e.g., once every 1 hour. In addition, as described below, the syncing of a KV store is also carried out at the time of migrating or cloning the virtual disk associated with the KV store.

Figure 2:
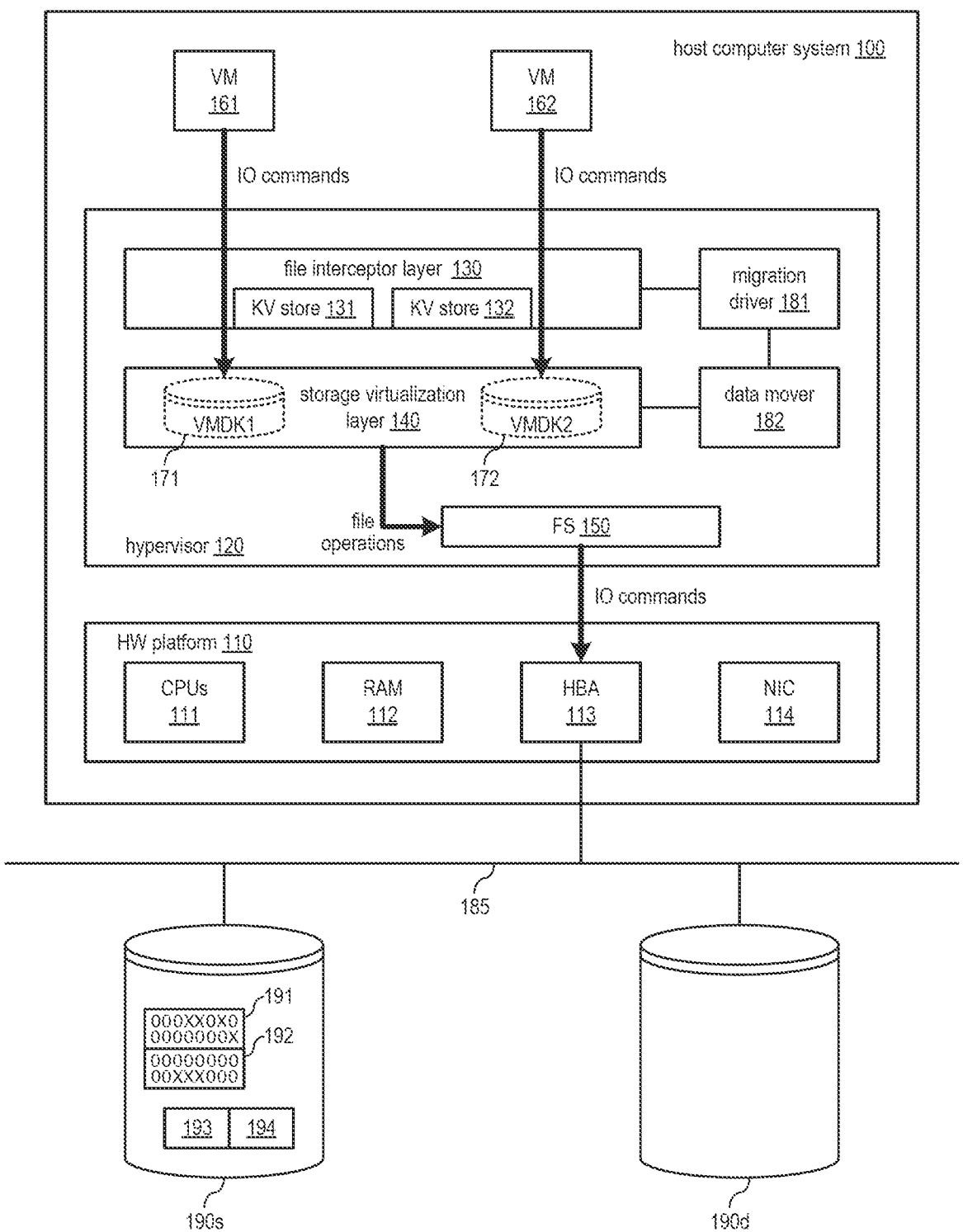
FIG. 2 illustrates a flow of commands through the host computer system of FIG. 1 in response to input/output commands issued by the virtual machines.

FIG. 2 illustrates a flow of commands through host computer system 100 (in thick lines) in response to virtual IO commands issued by VMs 161 and 162. File interceptor layer 130 intercepts these virtual IO commands and updates the KV stores in accordance with the method of FIG. 3. These virtual IO commands are then processed by storage virtualization layer 140, which translates these virtual IO commands into file operations that target files representing the virtual disks to which the virtual IO commands were issued. The file operations are then passed onto file system 150, which issues physical IO commands onto storage area network 185 through HBA 113. Each physical IO command is then processed by the storage device that is storing the file representing the virtual disk to which the corresponding virtual IO command was issued. After processing the physical IO successfully, the storage device returns read data in response to a physical IO command that is a read IO command and an acknowledgement in response to a physical IO command that is a write IO command. If the storage device is unable to process the physical IO successfully, it returns an error.

For example, in response to write IO commands issued by VM 161 to VMDK1 171, storage device 190s writes to locations therein corresponding to file 191, and in response to write IO commands issued by VM 162 to VMDK1 172, storage device 190s writes to locations therein corresponding to file 192. The writing to files 191 and 192 result in zero blocks becoming non-zero blocks and non-zero blocks are depicted with an "X" in FIG. 2.

Figure 3:
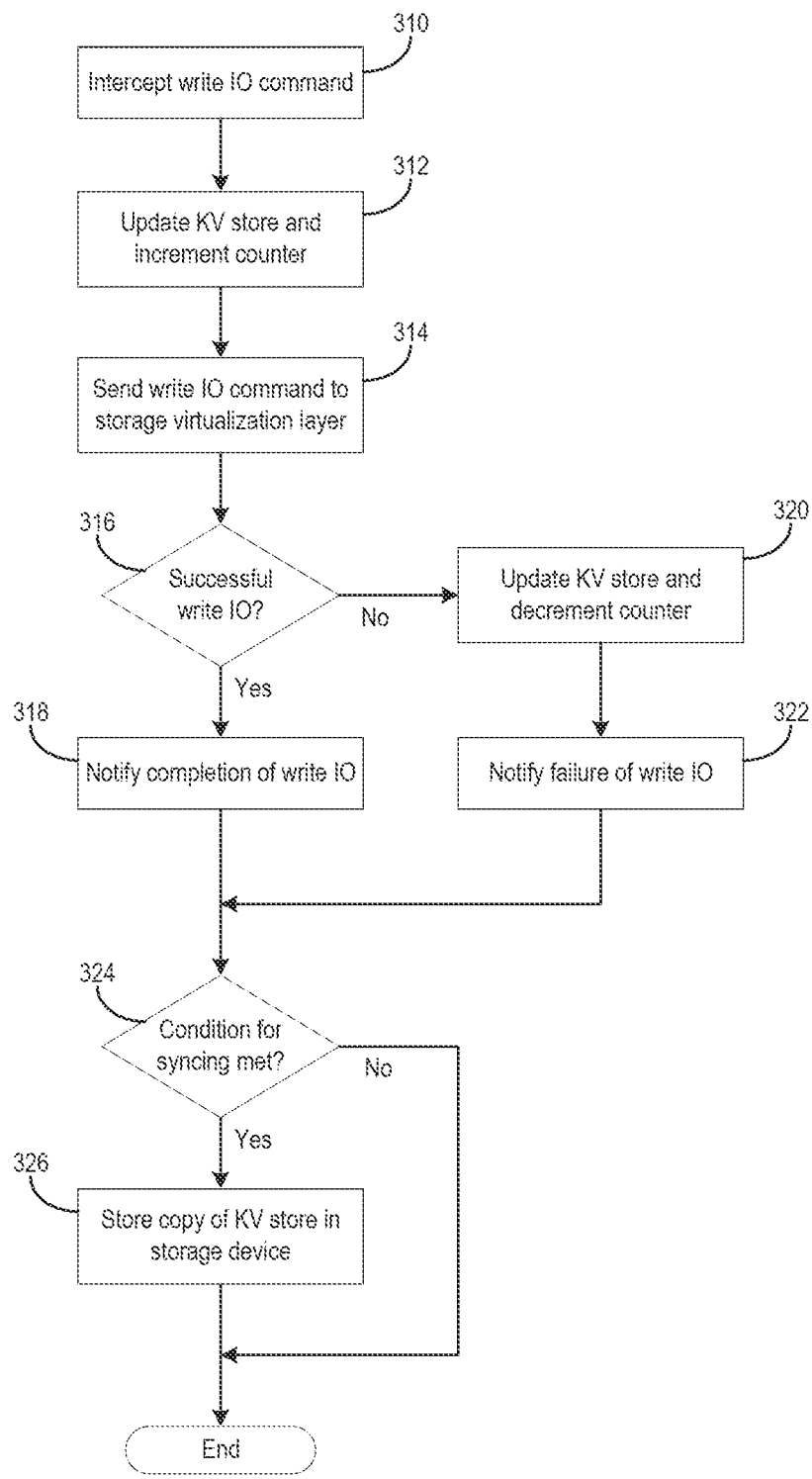
FIG. 3 is a flow diagram depicting steps of a method for updating a zero-block tracking data structure according to embodiments.

FIG. 3 is a flow diagram depicting steps of a method for updating a zero-block tracking data structure according to embodiments. This method is carried out by file interceptor layer 130 whenever a write IO command is issued by one of the VMs (e.g., VM 161 or VM 162) to a virtual disk (e.g., VMDK1 171 or VMDK2 172). At step 310, file interceptor layer 130 intercepts the write IO command from the VM and examines it to extract the logical block addresses of the blocks of the virtual disk that are being written. Then, at step 312, file interceptor layer 130 updates the KV store corresponding to the virtual disk targeted by the write IO (e.g., KV store 131 if VMDK1 171 is targeted or KV store 132 if VMDK 172 is targeted, hereinafter referred to as the "target KV store"). In particular, file interceptor layer 130 sets the values associated with the logical block addresses (keys) of the blocks that are being written to '1'. In addition, file interceptor layer 130 increments a count that represents the number of times the target KV store has been updated. At step 314, file interceptor layer 130 transmits the write IO command to storage virtualization layer 140 and then waits for a response from storage virtualization layer 140. When the write IO completes successfully after being processed by storage virtualization layer 140, FS 150, and a target storage device (e.g., storage device 190s) in which the blocks that are being written are located, an acknowledgement is returned by storage virtualization layer 140. On the other hand, when the write IO does not complete successfully, an error is returned by storage virtualization layer 140.

At step 316, file interceptor layer 130 determines from the response returned by storage virtualization layer 140 whether or not the write IO completed successfully. If successful (step 316, Yes), file interceptor layer 130 at step 318 notifies the VM that issued the write IO command that the write IO completed successfully. If not successful (step 316, No), file interceptor layer 130 at step 320 updates the target KV store to undo the change made at step 312 (e.g., resets the values associated with the logical block addresses (keys) of the blocks that were written to unsuccessfully to '0') and decrements the count that represents the number of times the target KV store has been updated, and at step 322 notifies the VM that issued the write IO command that the write IO failed to complete successfully.

After steps 318 and 322, file interceptor layer 130 at step 324 checks the condition for syncing the copy of the target KV store that is in persistent storage with the one that is in RAM 112. As noted above, the condition for syncing is met when either the number of times the target KV store has been updated, which is tracked by the above-described count, exceeds a threshold number, or the time elapsed from the last sync is greater than a threshold time. If the condition is met (step 324, Yes), file interceptor layer 130 at step 326 saves the target KV store that is in RAM 112 in the target storage device. The method ends after step 326 or if the condition for syncing is not met (step 324, No).

Figure 4:
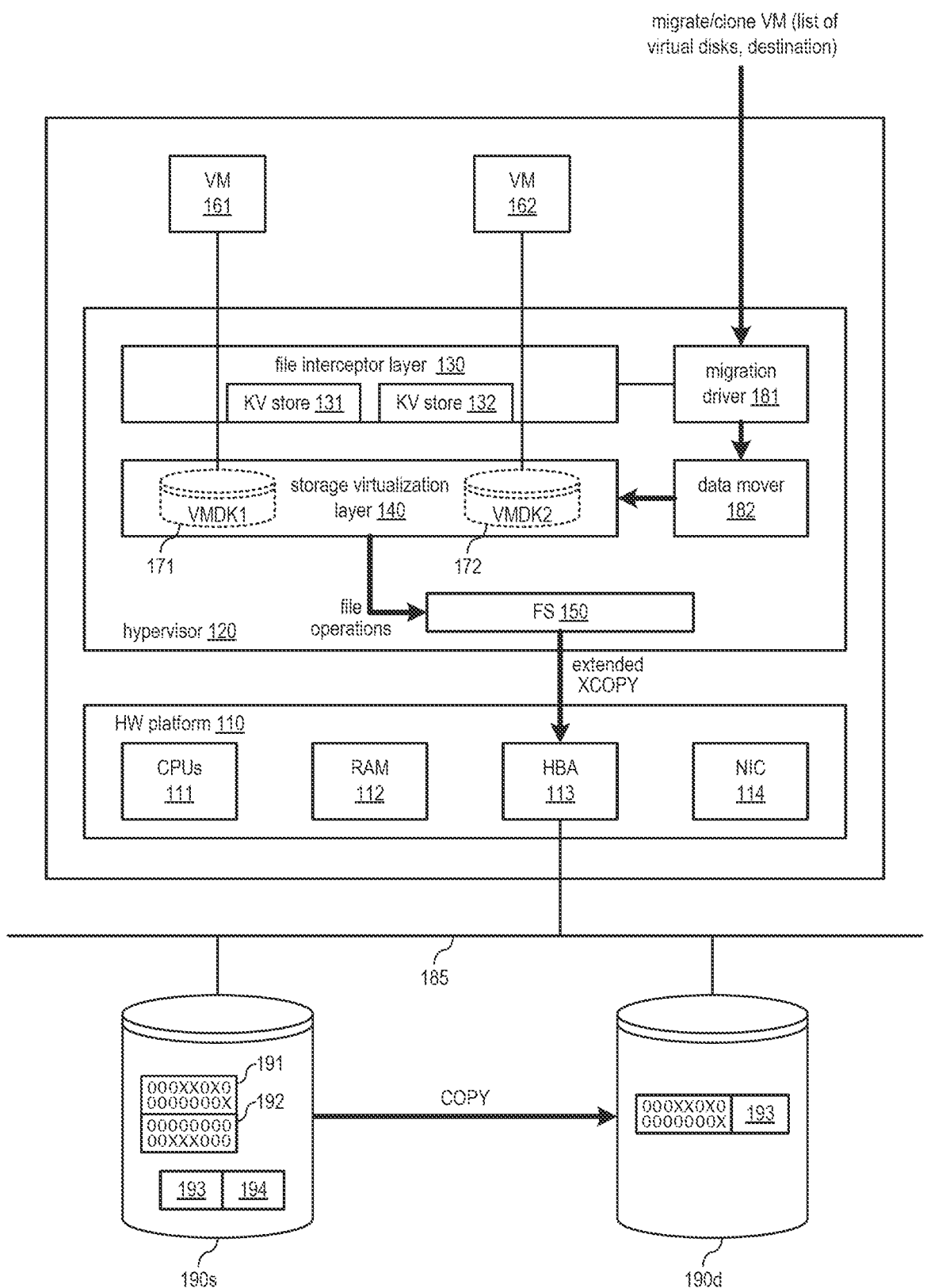
FIG. 4 illustrates a flow of commands through the host computer system of FIG. 1 in response to an instruction to migrate or clone virtual disks.
Figure 5:
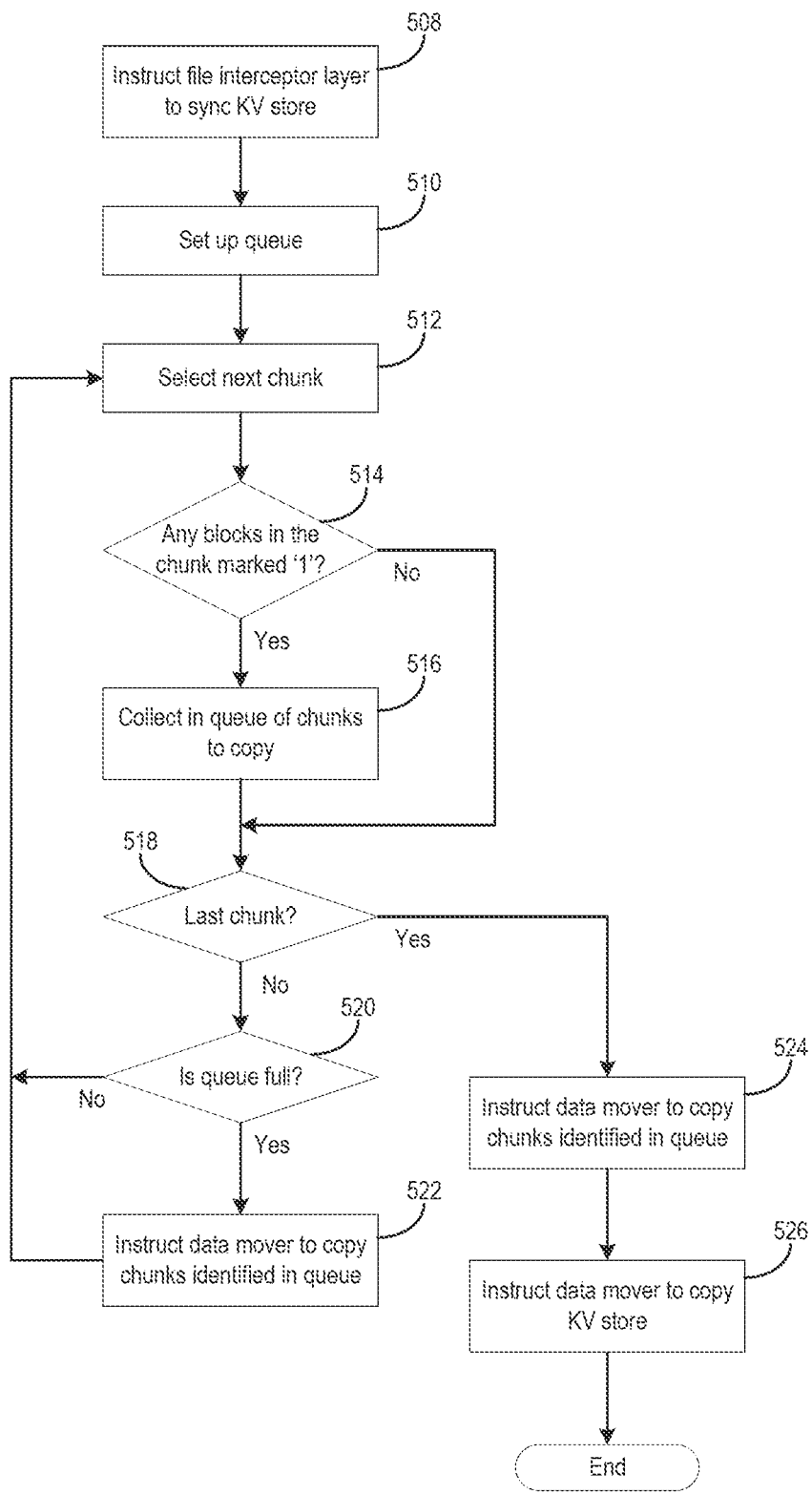
FIG. 5 is a flow diagram depicting steps of a method for migrating or cloning a virtual disk according to embodiments.

FIG. 4 illustrates a flow of commands through host computer system 100 (in thick lines) in response to an instruction to migrate or clone virtual disks, and FIG. 5 is a flow diagram depicting steps of a method for migrating or cloning virtual disks according to embodiments. This method is carried out by a migration driver 181 that is depicted as a component of hypervisor 120 in FIGS. 1, 2, and 4. Migration driver 181 is responsive to commands from a VM management server (not shown) which is responsible for deploying and managing the virtual infrastructure that includes VM 161, VM 162, VMDK1 171, and VMDK2 172. The commands from the VM management server that triggers the migration or cloning of one or more virtual disks include a command to migrate a VM between hosts and to migrate its virtual disk or disks between storage devices, a command to migrate just the virtual disk or disks between storage devices for load balancing purposes, and a command to replicate the virtual disk or disks in one storage device in another storage device for backup purposes. These commands include a list of the virtual disks to be migrated or cloned and an identifier of the destination storage device.

Migration driver 181 employs data mover 182 for copying blocks of the virtual disk or disks that are to be migrated or cloned, and data mover 182 issues copy commands in units of chunks. In the embodiments illustrated herein, the chunk size is an integer multiple of the block size. In some embodiments, the chunk size may be equal to the block size. In addition, in the embodiments illustrated herein, a queue having multiple (e.g., 8) entries is set up in RAM 112 and when the queue is full or the last block of a virtual disk has been evaluated for migration or cloning, data mover 182 issues a copy command for the chunks whose identifiers have been added to the queue.

The copy command issued by data mover 182 is received and processed by storage virtualization layer 140. For each chunk being copied, the copy command identifies the offset from the beginning of the virtual disk being migrated or cloned, the length (which is the chunk size), and the identifier of the destination storage device. Storage virtualization layer 140 translates the copy command into file operations that target the file representing the virtual disk being migrated or cloned. The file operations are then passed onto file system 150, which issues an extended XCOPY command onto storage area network 185 through HBA 113. The extended XCOPY command is an advanced SCSI (Small Computer Storage Interface) command that offloads copying operations to the storage devices. The extended XCOPY command includes the following parameters:

- identifier of the source storage device (this is the storage device in which blocks of the virtual disk being migrated or cloned are located)
- offset into logical block address space of the source storage device maintained by FS 150 (this acts as a pointer to the blocks that need to be migrated or cloned)
- length of blocks being migrated or cloned
- identifier of the destination storage device (this is the storage device identified in the command from the VM management server that triggered the migration/cloning)
- offset into logical block address space of the destination storage device maintained by FS 150
- length of blocks being migrated or cloned In response to the XCOPY command issued by FS 150, the source storage device identified in the command directly communicates with the destination storage device identified in the command to copy blocks from the source storage device to the destination storage device without any involvement by FS 150. Additional details on migrating or cloning virtual disks are described below with reference to the steps depicted in FIG. 5.

The method depicted in FIG. 5 is carried out by migration driver 181 for each virtual disk to be cloned or migrated in response to a command received from the VM management server to clone or migrate virtual disks. At step 508, migration driver 181 instructs file interceptor layer 130 to sync the copy of the KV store corresponding to the virtual disk, which is in persistent storage, with the one that is in RAM 112. Then, migration driver 181 at step 510 sets up the queue having entries that identify which chunks of the virtual disk are to be copied. After the queue is set up at step 510, migration driver 181 iterates through each unique chunk of the virtual disk. For example, if there are 5 blocks per chunk and the block size is 4 MB, there will be 50 chunks to iterate through for a 1 GB virtual disk.

At step 512, migration driver 181 selects the next chunk for processing. Then, at step 514, migration driver 181 communicates with file interceptor layer 130 to determine using the KV store corresponding to the virtual disk if any of the blocks in the selected chunk is a non-zero block. If the chunk has any non-zero blocks (step 514, Yes), migration driver 181 at step 516 adds the chunk ID to the queue and executes step 518 thereafter. If the chunk has all zero blocks (step 514, No), step 516 is skipped and step 518 is executed thereafter.

At step 518, migration driver 181 determines if the chunk selected at step 512 is the last chunk of the virtual disk. If it is not the last chunk (step 518, No), migration driver 181 at step 520 determines if the queue is full. If the queue is full (step 520, Yes), migration driver 181 at step 522 instructs data mover 182 to copy the chunks identified in the queue. In response, data mover 182 issues the copy command described above to storage virtualization layer 140, and as further described above the extended XCOPY command is issued by FS 150 as a result of thereof.

The execution flow returns to step 512 where the next chunk is selected for processing after step 522 and if the queue is determined not to be full at step 520. When the chunk selected at step 512 is the last chunk (step 518, Yes), migration driver 181 at step 524 instructs data mover 182 to copy the chunks identified in the queue, if any. In response, data mover 182 issues the copy command described above to storage virtualization layer 140, and as further described above the extended XCOPY command is issued by FS 150 as a result of thereof.

Upon processing all of the chunks of the virtual disk, migration driver 181 instructs data mover 182 to also make a copy of files associated with the virtual disk that is in the source storage device (e.g., files 193 if VMDK1 171 is being migrated or files 194 if VMDK2 172 is being migrated) in the destination storage device. In response, data mover 182 issues the copy command for these files to storage virtualization layer 140, and the extended XCOPY command is issued by FS 150 as a result of thereof. After the switchover to the virtual disk that has been migrated to or cloned in the destination storage device, the KV store that is in the destination storage device will serve as the data structure that is tracking whether blocks of a virtual disk are zero blocks or non-zero blocks.

In the embodiments described above, a key-value store is implemented as the data structure for tracking whether blocks of a virtual disk are zero blocks or non-zero blocks. In other embodiments, a different data structure may be used. For example, a bitmap may be used where each bit in the bitmap represents a block of the virtual disk and the value of the bit indicates whether or not the block is a zero block or a non-zero block.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The terms computer readable medium or non-transitory computer readable medium refer to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of migrating or cloning a virtual disk stored in a first storage device of a host computer system having a hypervisor running therein, wherein the hypervisor employs a file system to organize data stored in the first storage device as files in units of blocks, and the virtual disk is one of the files containing blocks, said method comprising:
   upon creation of the virtual disk, writing zeroes into all blocks of the virtual disk;
   in response to receiving a command to migrate or clone the virtual disk, accessing a data structure that tracks for each block of the virtual disk to which zero was written upon creation of the virtual disk, whether or not the block has been written to successfully since the writing of zero thereinto upon creation of the virtual disk;
   for each of a plurality of unique sets of blocks, determining using the data structure whether or not any of the blocks in the unique set has been written to successfully since the writing of zero thereinto upon creation of the virtual disk;
   for each unique set determined to have at least one block that has been written to successfully since the writing of zero thereinto upon creation of the virtual disk, issuing a first copy command to make a copy of all blocks in the unique set in a second storage device; and
   issuing a second copy command to make a copy of the data structure in the second storage device.

2. The method of claim 1, wherein the blocks of the virtual disk each have the same size and the unique sets of blocks each have the same number of blocks.

3. The method of claim 2, wherein the number of blocks in each of the unique sets is more than one.

4. The method of claim 1, wherein the first copy command identifies the virtual disk and the second storage device, and specifies locations of the blocks to be copied.

5. The method of claim 4, wherein the locations of the blocks to be copied are specified using an offset value indicating an amount of offset from a beginning of the virtual disk and a length value indicating the total length of all the blocks to be copied.

6. The method of claim 1, further comprising:
   tracking the unique sets of blocks to be copied in a queue, wherein
   the first copy command is issued for each unique set of blocks to be copied when the queue is full.

7. The method of claim 1, further comprising:
   converting one or more first copy commands to a set of new copy commands; and
   issuing the set of new copy commands to the first storage device.

8. The method of claim 7, wherein the new copy commands offload copying operations to the first storage device.

9. The method of claim 8, wherein the file system performs the steps of converting and issuing, and the first storage device executes the copying operations in response to the new copy commands by transferring blocks to be copied between the first storage device and the second storage device without any transfer of blocks to be copied to the file system.

10. A non-transitory computer-readable medium comprising instruction executable in a computer system having a hypervisor running therein, wherein the instructions when executed in the computer system cause the computer system to carry out a method of migrating or cloning a virtual disk stored in a first storage device of the computer system, wherein the hypervisor employs a file system to organize data stored in the first storage device as files in units of blocks, and the virtual disk is one of the files containing blocks, said method comprising:
   upon creation of the virtual disk, writing zeroes into all blocks of the virtual disk;
   in response to receiving a command to migrate or clone the virtual disk, accessing a data structure that tracks for each block of the virtual disk to which zero was written upon creation of the virtual disk, whether or not the block has been written to successfully since the writing of zero thereinto upon creation of the virtual disk;
   for each of a plurality of unique sets of blocks, determining using the data structure whether or not any of the blocks in the unique set has been written to successfully since the writing of zero thereinto upon creation of the virtual disk;
   for each unique set determined to have at least one block that has been written to successfully since the writing of zero thereinto upon creation of the virtual disk, issuing a first copy command to make a copy of all blocks in the unique set in a second storage device; and
   issuing a second copy command to make a copy of the data structure in the second storage device.

11. The non-transitory computer readable-medium of claim 10, wherein the blocks of the virtual disk each have the same size and the unique sets of blocks each have the same number of blocks that is more than one.

12. The non-transitory computer readable-medium of claim 10, wherein the copy command identifies the virtual disk and the second storage device, and specifies locations of the blocks to be copied.

13. The non-transitory computer readable-medium of claim 12, wherein the locations of the blocks to be copied are specified using an offset value indicating an amount of offset from a beginning of the virtual disk and a length value indicating the total length of all the blocks to be copied.

14. The non-transitory computer readable-medium of claim 10, wherein the method further comprises:
   tracking the unique sets of blocks to be copied in a queue, wherein
   the first copy command is issued for each unique set of blocks to be copied when the queue is full.

15. The non-transitory computer readable-medium of claim 10, wherein the method further comprises:
   converting one or more first copy commands to a set of new copy commands; and
   issuing the set of new copy commands to the first storage device.

16. The non-transitory computer readable-medium of claim 15, wherein the new copy commands offload copying operations to the first storage device.

17. A computer system connected via a network to first and second storage devices and having a hypervisor running therein, said computer system comprising a processor and system memory, wherein the hypervisor employs a file system to organize data stored in the first storage device as files in units of blocks, and the processor is programmed to execute the steps of migrating or cloning a virtual disk stored in the first storage device, wherein the virtual disk is one of the files containing blocks and the steps executed by the processor comprise:
   upon creation of the virtual disk, writing zeroes into all blocks of the virtual disk;
   in response to receiving a command to migrate or clone the virtual disk, accessing a data structure that is stored in the system memory and tracks for each block of the virtual disk to which zero was written upon creation of the virtual disk, whether or not the block has been written to successfully since the writing of zero thereinto upon creation of the virtual disk;
   for each of a plurality of unique sets of blocks, determining using the data structure whether or not any of the blocks in the unique set has been written to successfully since the writing of zero thereinto upon creation of the virtual disk;
   for each unique set determined to have at least one block that has been written to successfully since the writing of zero thereinto upon creation of the virtual disk, issuing a first copy command to make a copy of all blocks in the unique set in the second storage device; and
   issuing a second copy command to make a copy of the data structure in the second storage device.

18. The computer system of claim 17, wherein the copy command identifies the virtual disk and the second storage device, and specifies locations of the blocks to be copied.

19. The computer system of claim 18, wherein the locations of the blocks to be copied are specified using an offset value indicating an amount of offset from a beginning of the virtual disk and a length value indicating the total length of all the blocks to be copied.

20. The computer system of claim 17, wherein the steps further comprise:
   converting one or more first copy commands to a set of new copy commands; and
   issuing the set of new copy commands to the first storage device, wherein
   the new copy commands offload copying operations to the first storage device, and the first storage device executes the copying operations in response to the new copy commands by transferring blocks to be copied between the first storage device and the second storage device without any transfer of blocks to be copied to the file system.

* * * * *